United States Patent

Sonobe et al.

(10) Patent No.: US 9,005,699 B2
(45) Date of Patent: Apr. 14, 2015

(54) METHOD FOR MANUFACTURING MAGNETIC RECORDING MEDIUM

(75) Inventors: Yoshiaki Sonobe, Singapore (SG); Teiichiro Umezawa, Singapore (SG); Koichi Wago, San Jose, CA (US)

(73) Assignee: WD Media, LLC, Singapore (SG)

( * ) Notice: Subject to any disclaimer, the term of this patent is extended or adjusted under 35 U.S.C. 154(b) by 910 days.

(21) Appl. No.: 11/862,410

(22) Filed: Sep. 27, 2007

(65) Prior Publication Data

US 2008/0075845 A1 Mar. 27, 2008

(30) Foreign Application Priority Data

Sep. 27, 2006 (JP) .................. 2006-262810

(51) Int. Cl.
| | |
|---|---|
| B05D 5/12 | (2006.01) |
| G11B 5/66 | (2006.01) |
| G11B 5/84 | (2006.01) |
| G11B 5/74 | (2006.01) |
| G11B 23/00 | (2006.01) |
| G11B 7/20 | (2006.01) |

(52) U.S. Cl.
CPC ... G11B 5/66 (2013.01); G11B 5/84 (2013.01)

(58) Field of Classification Search
USPC .................. 427/128, 129, 130, 131
See application file for complete search history.

(56) References Cited

U.S. PATENT DOCUMENTS

| | | | |
|---|---|---|---|
| 6,266,210 B1 * | 7/2001 | Shiroishi | 360/125.5 |
| 6,331,364 B1 * | 12/2001 | Baglin et al. | 428/830 |
| 6,468,670 B1 | 10/2002 | Ikeda et al. | |
| 6,719,841 B2 * | 4/2004 | Chen et al. | 117/87 |
| 6,777,112 B1 * | 8/2004 | Girt et al. | 428/828 |
| 2004/0258833 A1 * | 12/2004 | Kamata et al. | 427/130 |
| 2005/0041335 A1 * | 2/2005 | Kikitsu et al. | 360/110 |
| 2006/0196040 A1 * | 9/2006 | Cyrille et al. | 29/603.12 |
| 2007/0054421 A1 * | 3/2007 | Ueda et al. | 438/3 |
| 2007/0190328 A1 * | 8/2007 | Cowburn et al. | 428/409 |
| 2008/0131548 A1 * | 6/2008 | Gauzner et al. | 425/175 |

FOREIGN PATENT DOCUMENTS

| | | |
|---|---|---|
| GB | 1443248 A | 7/1976 |
| JP | 5205257 A | 8/1993 |
| JP | 05-303736 | 11/1993 |
| JP | 2002-288813 | 4/2002 |
| JP | 2003030827 A | 1/2003 |

(Continued)

OTHER PUBLICATIONS

Herrera Velarde et al. "Disorder-induced vs temperature-induced melting of two-dimensional colloidal crystals" 2008.*

(Continued)

*Primary Examiner* — Austin Murata

(57) ABSTRACT

A method for manufacturing a magnetic recording medium includes the steps of (a) forming a perpendicular magnetic recording layer and (b) applying an ion beam to regions between tracks of the perpendicular magnetic recording layer so as to form separation regions for magnetically separating the tracks from each other. In the step (a), a continuous film layer composed of a multilayer film is formed, and CoB layers and Pd layers are laminated in the multilayer film. In the step (b), the CoB layers and the Pd layers are melted by the ion beam so as to form an alloy of metals contained in the CoB layers and the Pd layers to thereby form the separation regions.

6 Claims, 5 Drawing Sheets

(56) References Cited

FOREIGN PATENT DOCUMENTS

| | | |
|---|---|---|
| JP | 2005223178 A | 8/2005 |
| JP | 2005-293633 | 10/2005 |
| JP | 2006-031849 | 2/2006 |
| JP | 2007226862 A | 9/2007 |

OTHER PUBLICATIONS

Xiao et al. "Effects of Ar-ion implantation and annealing on structural and magnetic properties of Co/Pd multilayers" 1994.*

Japanese Office Action corresponding to Japanese Patent Application No. 2006-262810, dated Mar. 16, 2010.

Dieter Suess, et al., Optimization of Exchange Spring Perpendicular Recording Media, IEEE Transactions on Magnetics, vol. 41, No. 10, Oct. 2005.

Final Examination Report dated Feb. 21, 2011 in Singapore application No. 200708935-2, 7 pages.

Final Office Action (Decision of Rejection) dated Mar. 5, 2010, translation drafted Jul. 23, 2010 for corresponding Japanese Patent Application No. 2006-262810, 5 pages.

* cited by examiner

METHOD FOR MANUFACTURING MAGNETIC RECORDING MEDIUM

This application is based upon and claims the benefit of priority from Japanese patent application No. 2006-262810, filed on Sep. 27, 2006, the disclosure of which is incorporated herein in its entirety by reference.

BACKGROUND OF THE INVENTION

The present invention relates to a method for manufacturing a magnetic recording medium.

In recent years, the information-oriented society has become sharply advanced. Magnetic recording apparatuses are typified by a hard disk drive (HDD). Magnetic disks have been required to have a diameter of 2.5 inches and an information recording capacity exceeding 200 gigabytes per disk. In order to meet these needs for magnetic disks, realization of information recording density (areal density) exceeding 900 gigabits per square inch (200 Gbit/in$^2$) is required. A perpendicular magnetic recording system including a double-layer perpendicular medium and a single-pole head can exhibit high recording resolution and, therefore, has been researched as a next-generation high-density recording system.

An improvement of the areal density of the magnetic recording disk is achieved by an improvement of the linear density and an improvement of the track density. The improvement of the linear density needs to realize well-balanced three factors, a reduction of magnetic transition region noises of a recording layer, an improvement of thermal stability of recorded signals, and recording ease. For the purpose of realizing them, heretofore, coupled granular and continuous (CGC) media including granular layers and continuous film layers have been proposed (refer to, for example, U.S. Pat. No. 6,468,670 B1).

In such CGC media, magnetic transition region noises can be reduced by using a granular layer as a main recording layer. In the granular layer, nonmagnetic substances have segregated at grain boundaries of magnetic crystal grains. Thus, the influence of the magnetic transition region can be substantially eliminated in the main recording layer. Further, the thermal stability of recorded signals can be improved by using a continuous film layer as an auxiliary recording layer. The continuous film layer has magnetic bonding strength in a direction parallel to a main surface of a substrate, the continuous film layer and the granular layer are magnetically exchange-coupled, and the magnetization of the continuous film layer is pinned by the magnetization of the granular layer. In this manner, an increase in recording density of the CGC medium can be achieved.

In recent years, an exchange spring medium including a soft magnetic layer on a granular layer, an exchange coupled composite, and the like have been proposed as configurations for performing the function similar to, for example, the function of the continuous film layer of the CGC medium (refer to, for example, IEEE Trans. Magn: Vol. 41, No. 10, pp 3166-3168, October 2005). Hereinafter, these configurations are referred to as CGC media and the like. The exchange coupled composite may also be referred to as a hard/stacked medium.

SUMMARY OF THE INVENTION

The inventor of the present invention found out that the control of the magnetic recording region in a track width (erase width) direction is very difficult in the CGC media and the like as compared with the control in the case where, for example, no continuous film layer is included but merely a granular layer is included. For example, in the CGC media and the like, the values of recorded signals become values between 0 and 1 in a gray region, the gray region may extend in the track width direction. Consequently, a reduction of track edge noises often becomes difficult. The reason for this is as described below. The continuous film layer and the soft magnetic layer are auxiliary recording layers for playing a supplementary role relative to the granular layer serving as a main recording layer, and have magnetic bonding strength in a direction parallel to the main surface of a substrate. Therefore, a recording region expands when viewed from a head. This expanded portion relative to the recording region is a gray region. An increase of this region corresponds to an increase of the track width. Consequently, in the CGC media and the like, an improvement of the track density may become difficult.

Accordingly, it is an object of the present invention to provide a method for manufacturing a magnetic recording medium useful for solving the above described problems.

Regarding the above-described problems, the inventor of the present invention conducted a study of separation of tracks from each other through formation of grooves in track edges of a magnetic recording medium by, for example, a mechanical method. According to this, it is believed to be possible to suppress expansion of gray regions of recorded signals in a track width direction.

However, in the case where realization of the recording density exceeding 200 gigabits per square inch is intended, the width of the groove to be formed becomes very small. In this case, formation of a narrow groove having a predetermined width may become difficult. In the case where tracks are separated from each other by grooves, a flattening process or the like may be required after formation of the grooves, in addition to a mechanical working process. Therefore, the production process becomes complicated and a cost increase may results.

The inventor of the present invention further conducted intensive research and has made the invention wherein tracks can be separated from each other with high precision and a mechanical working process and a flattening process are unnecessary. The present invention has the following structures.

(Structure 1)

A method for manufacturing a magnetic recording medium comprising the steps of:

(a) forming a magnetic recording layer; and (b) applying an ion beam to regions between tracks of the magnetic recording medium so as to form separation regions for magnetically separating the tracks from each other. In the step of applying the ion beam, separation regions may be further formed in regions between recording bits in the tracks. In this case, the separation regions magnetically separate the recording bits from each other in the tracks.

In this manner, the separation regions can be formed without using the mechanical working process nor the flattening process. Further, for example, track edge noises are reduced so as to increase track density.

The regions to be irradiated with the ion beam can be set with high precision by using, for example, various masks, e.g., a silicon stencil mask and a mask formed by nanoimprint technology. Consequently, the separation regions can be formed with high precision. Further, since the boundary portion of the magnetic field distribution becomes sharp, for example, further narrower tracks can be formed.

In the step of applying the ion beam, for example, the crystal structure of the magnetic layer is changed by the energy of the ion beam. In this manner, the region irradiated with the ion beam is changed to a nonmagnetic region. Consequently, nonmagnetic separation regions are formed in the step of applying the ion beam.

In the step of applying the ion beam, for example, an ion beam of argon ion (Ar+) is accelerated with energy of 20 to 30 keV and is applied. In this manner, the separation regions can be appropriately formed. An ion beam of phosphorous ion (P+) or the like may be applied in the step of applying the ion beam.

The track refers to a region in a magnetic recording medium and magnetic signals are recorded on the region. The track is extended in a direction of scanning of a head relative to the magnetic recording medium. In the magnetic recording medium, for example, a plurality of tracks are disposed so as to leave predetermined spaces to adjacent tracks. In the case where the magnetic recording medium is a magnetic disk, a plurality of tracks are disposed concentrically around the center of the magnetic disk. The region between tracks refers to a gap region between adjacent tracks.

(Structure 2)

In the step (a), a multilayer film is formed as at least a part of the magnetic recording layer, and a plurality of types of metal films having different compositions are laminated in the multilayer films, and in the step (b), the plurality of types of metal films are melted by the ion beam so as to form an alloy of metals contained in the plurality of types of metal films to thereby form the separation regions.

In this manner, the crystal structure of the magnetic recording layer can be appropriately changed. The separation regions between the tracks can be appropriately formed. Further, since the separation regions become easy to form, the separation regions can be formed by ion beam irradiation with a low amount of irradiation. Therefore, for example, narrow separation regions can be formed with higher precision. Consequently, the track density can be further appropriately improved. Moreover, since the interface magnetic anisotropy is generated at interfaces of films constituting the multilayer film, for example, the magnetic recording layer may be formed into a thinner layer by using the multilayer film. In this case, the separation regions can be formed with higher precision.

(Structure 3)

The magnetic recording layer comprises a first magnetic layer and a second magnetic layer, the first magnetic layer and the second magnetic layer being exchange-coupled to each other, the step (a) comprising the steps of forming the first magnetic layer, and forming the second magnetic layer on the first magnetic layer, and in the step (b), the second magnetic layer is irradiated with the ion beam so as to form the separation regions substantially only in the second magnetic layer of the first magnetic layer and the second magnetic layer.

In this manner, the separation regions can be formed with high precision as compared with that in the case where, for example, the separation regions are disposed in both the first magnetic layer and the second magnetic layer of the magnetic recording layer. As a consequence, the track density can be further appropriately improved.

The phrase "forming separation regions substantially only in the second magnetic layer" includes the case where, for example, separation regions are also disposed in a part of the first magnetic layer within the range of not affecting precision nor man-hour of formation of the separation regions. The magnetic recording layer may further include other layers between the first magnetic layer and the second magnetic layer. For example, the magnetic recording layer further has a coupling control layer between the first magnetic layer and the second magnetic layer, and the coupling control layer controls the exchange coupling between the two layers. The second magnetic layer may be a multilayer film. In the step of forming the second magnetic layer, for example, the second magnetic layer is formed having a composition different from the composition of the first magnetic layer. In the step of forming the second magnetic layer, preferably, the second magnetic layer is formed to become thinner than the first magnetic layer.

(Structure 4)

The magnetic recording medium is used for perpendicular magnetic recording, the first magnetic layer has magnetic crystal grains exhibiting perpendicular magnetic anisotropy and nonmagnetic substances for magnetically separating the magnetic crystal grains from each other at grain boundaries of the magnetic crystal grains, and the second magnetic layer has magnetic grains exchange-coupled to the magnetic crystal grains, a grain boundary width of the magnetic grains being smaller than a grain boundary width of the magnetic crystal grains. The grain boundaries of magnetic crystal grains refer to, for example, regions having an irregular atomic arrangement at boundaries between magnetic crystal grains.

The magnetic recording medium produced by this manufacturing method is, for example, a coupled granular and continuous (CGC) medium, but may be an exchange spring medium, an exchange coupled composite medium, or the like.

In this case, magnetic transition region noises can be reduced because, for example, magnetic crystal grains in the first magnetic layer are magnetically separated from each other by nonmagnetic substances. Pinning of magnetization of the second magnetic layer by magnetization of the first magnetic layer can increase the density. Further, the thermal stability of recorded signals can be improved by, for example, decreasing the width of grain boundaries of magnetic grains in the second magnetic layer to be exchange-coupled to magnetic crystal grains. Such a structure can also appropriately achieve recording ease of signals. Consequently, the linear density of magnetic recording can be appropriately increased by such a structure.

In the CGC media and the like including, for example, a continuous film layer and the like on a granular layer, the thickness of the magnetic recording layer is, for example, 15 to 20 nm. In the perpendicular magnetic recording layer having such a thickness, for example, even where separation of tracks from each other is carried out by formation of grooves between the tracks, it is difficult to form narrow grooves or the like having predetermined widths. Likewise, even where formation of separation regions through ion beam irradiation is carried out, it is difficult to form separation regions with high precision because a large amount of ion beam irradiation is required for forming separation regions in both magnetic layers (for example, the granular layer and the continuous film layer) corresponding to the first magnetic layer and the second magnetic layer in the magnetic recording layer.

On the other hand, the inventor of the present invention conducted intensive research and found the following facts. For example, in CGC media and the like, expansion of gray regions of recorded signals in the track width direction was able to be appropriately suppressed by forming separation regions only in the magnetic layer corresponding to the second magnetic layer without impairing advantages, such as a reduction of magnetic transition region noises, an improvement of thermal stability of recorded signals, and recording ease, of the CGC media and the like, even when separation regions were not disposed in both magnetic layers corresponding to the first magnetic layer and the second magnetic layer in the magnetic recording layer. Track edge noises were reduced and the track density was allowed to increase. The separation regions were able to be appropriately formed through ion beam irradiation. Besides the CGC media and the like, similar effects were able to be obtained in the above-described structure including the first magnetic layer and the second magnetic layer. Therefore, the tracks can be appropriately separated by adopting the structure 4. Further, it is essential that the separation regions are disposed only in the second magnetic layer. Therefore, separation regions can be formed with high precision. Consequently, the track density can be further appropriately increased by adopting the structure 4.

The perpendicular magnetic anisotropy refers to, for example, magnetic anisotropy in which a magnetic moment tends to point in a direction perpendicular to a main surface of a substrate. The phrase "magnetically separate magnetic crystal grains from each other" refers to the fact that, for example, a magnetic exchange interaction between magnetic crystal grains is weakened and, thereby, the magnetic crystal grains are substantially prevented from being exchange-coupled to each other.

The magnetic crystal grains in the first magnetic layer are, for example, magnetic crystal grains in which the direction of magnetic moment is reversed in accordance with a signal to be recorded. The first magnetic layer may be a layer (granular layer) having a granular structure and the nonmagnetic substances in the form of oxides are segregated at grain boundaries of the magnetic crystal grains.

The width of grain boundaries of the magnetic crystal grains in the first magnetic layer is, for example, 2 nm or more. The width of grain boundaries of the magnetic grains in the second magnetic layer is, for example, 1 nm or less. According to such the structure, for example, magnetic transition region noises can be reduced by increasing the width of grain boundaries of the magnetic crystal grains in the first magnetic layer. Further, the thermal stability of recorded signals can be improved by decreasing the width of grain boundaries of the magnetic grains in the second magnetic layer. Consequently, the recording density of the magnetic recording medium can be further appropriately increased in this structure.

The magnetic grains in the second magnetic layer may be crystallized magnetic crystal grains. In this case, grain boundaries of the magnetic grains in the second magnetic layer refer to grain boundaries of the magnetic crystal grains. In the case where magnetic grains do not become crystals on the grounds that, for example, the second magnetic layer is thin, grain boundaries of the magnetic grains refer to, for example, regions occupied by impurities deposited between uniform magnetic grains having identical easy-to-magnetize axes. The phrase "the grain boundary width of the magnetic grains being smaller than that of the magnetic crystal grains of the first magnetic layer" also includes the case where, for example, the second magnetic layer is a layer having an amorphous structure or the like and substantially no grain boundary is present in the second magnetic layer.

(Structure 5)

The magnetic recording medium is used for perpendicular magnetic recording and comprises a substrate for disposing the first magnetic layer and the second magnetic layer, the first magnetic layer has magnetic crystal grains exhibiting perpendicular magnetic anisotropy and nonmagnetic substances for magnetically separating the magnetic crystal grains from each other at grain boundaries of the magnetic crystal grains, and the second magnetic layer has magnetic grains exchange-coupled to the magnetic crystal grains and exchange-coupled to each other with a strength larger than a bonding strength between the magnetic crystal grains in the first magnetic layer in a direction parallel to a main surface of the substrate.

In this case, the magnetization of the second magnetic layer can be appropriately pinned by the magnetic crystal grains in the first magnetic layer. Further, the thermal stability of recorded signals can be improved by a magnetic exchange interaction between the magnetic grains in the second magnetic layer. In this manner, the recording density of the magnetic recording medium can be appropriately increased.

In this case also, in a manner similar to that in the structure 4, the tracks can be appropriately separated from each other by, for example, disposing the separation regions substantially only in the second magnetic layer. Further, it is essential that the separation regions are disposed only in the second magnetic layer and, therefore, the separation regions can be formed with high precision. Consequently, the track density can be further appropriately increased.

(Structure 6)

The first magnetic layer is a layer having a granular structure and the nonmagnetic substances in the form of oxides are segregated at grain boundaries of the magnetic crystal grains, and the second magnetic layer is a laminated film comprising Co compound layers and Pd layers or Pt layers which are alternately laminated.

According to the present invention, for example, the track density can be increased by reducing track edge noises.

DESCRIPTION OF THE PREFERRED EMBODIMENTS

Figure 1A:
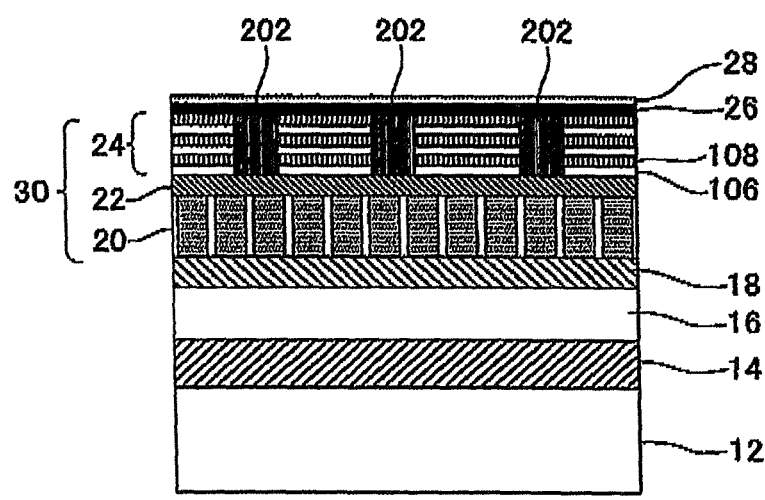
FIG. 1A is a diagram showing an example of a magnetic recording medium produced by a method for manufacturing a magnetic recording medium according to an embodiment of the present invention and shows an example of the structure of the magnetic recording medium.
Figure 1B:
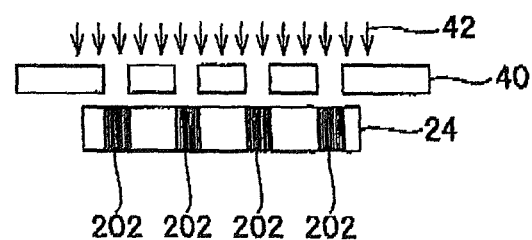
FIG. 1B is a diagram showing an example of a magnetic recording medium produced by a method for manufacturing a magnetic recording medium according to an embodiment of the present invention and shows a first example of an ion beam irradiation method in a step of applying an ion beam.

The embodiments according to the present invention will be described below with reference to the drawings. FIGS. 1A and 1B are diagrams showing an example of a magnetic recording medium 10 produced by a method for manufacturing a magnetic recording medium according to an embodiment of the present invention, FIG. 1A shows an example of the structure of the magnetic recording medium 10. The magnetic recording medium 10 is a magnetic disk of double-layer perpendicular medium system to be mounted on a hard disk drive (HDD) of perpendicular magnetic recording system.

In the present example, the magnetic recording medium 10 includes a substrate 12, an adhesion layer 14, a soft magnetic layer 16, an underlayer 18, a perpendicular magnetic recording layer 30, a protective layer 26, and a lubricant layer 28 in this order. The perpendicular magnetic recording layer 30 has a granular layer 20, a coupling control layer 22, and a continuous layer 24.

The substrate 12 is, for example, substrate glass. Examples of the substrate glass include aluminosilicate glass, aluminoborosilicate glass, and soda-time glass. Among them, the aluminosilicate glass is preferable. Alternatively, amorphous glass or crystallized glass can be used. For example, in the case where the soft magnetic layer 16 has an amorphous structure, it is preferable that the substrate glass is amorphous glass. The use of chemically strengthened glass is preferable because the rigidity is high.

Preferably, the surface roughness of the main surface of the substrate 12 is 6 nm or less in terms of Rmax and 0.6 nm or less in terms of Ra, Rmax and Ra are defined in Japanese Industrial Standards (JIS). Such a smooth surface can make the gap between, for example, the perpendicular magnetic recording layer 30 and the soft magnetic layer 16 constant. Consequently, a suitable magnetic circuit can be formed between the head (magnetic head), the perpendicular magnetic recording layer 30, and the soft magnetic layer 16. Further, the substrate 12 may be a substrate having an isotropic surface and no texture.

In the case where annealing in a magnetic field is required to, for example, control the magnetic domain of the soft magnetic layer 16, it is particularly preferable to use the substrate 12 made of a glass member. Since the glass member exhibits excellent heat resistance, the substrate 12 can be heated to a high temperature.

The adhesion layer 14 is a layer (contact layer) for increasing the adhesion between the substrate 12 and the soft magnetic layer 16. Peeling of the soft magnetic layer 16 can be prevented by disposing the adhesion layer 14, For example, a Ti-containing material can be used as a material for the adhesion layer 14. The film thickness of the adhesion layer 14 preferably falls within a range of 1 to 50 nm from the viewpoint of practical use, in the present example, the adhesion layer 14 is an amorphous CrTi layer. The film thickness of the adhesion layer 14 is, for example, about 10 nm.

The soft magnetic layer 16 is a layer for forming a magnetic circuit between the head and the perpendicular magnetic recording layer 30. The soft magnetic layer 16 is not specifically limited as far as the soft magnetic layer 16 is formed by a magnetic substance exhibiting a soft magnetic characteristic. However, a preferable magnetic characteristic is, for example, 0.01 to 80 oersted in terms of coercive force Ho, desirably 0.01 to 50 oersted. Further, a preferable magnetic characteristic is 500 emu/c to 1,920 emu/cc in terms of saturation magnetic flux density Bs.

Examples of materials for the soft magnetic layer 16 include Fe based materials and Co based materials. For example, use may be made of Fe based soft magnetic materials, e.g., FeTaC based alloys, FeTaN based alloys, FeNi based alloys, FeCoB based alloys, and FeCo based alloys, Co based soft magnetic materials, e.g., CoTaZr based alloys and CoNbZr based alloys, and FeCo based alloy soft magnetic materials.

The film thickness of the soft magnetic layer 16 is, for example, 10 to 200 nm, desirably 20 to 100 nm. If the film thickness is less than 10 nm, it may become difficult to form a suitable magnetic circuit between the head, the perpendicular magnetic recording layer 30, and the soft magnetic layer 16. If the film thickness exceeds 200 nm, the surface roughness may increase. Further, if the film thickness exceeds 200 nm, control of the magnetic domain often becomes difficult.

A large magnetic domain is easy to generate in the soft magnetic layer 16. When the large magnetic domain moves, noises may be generated. Therefore, the soft magnetic layer 16 preferably has a plurality of soft magnetic material layers which are anti ferro magnetically coupled (AFO). According to this structure, movement of the magnetic domains becomes difficult. Thus, generation of noise can be suppressed.

In the present example, the soft magnetic layer 16 has a plurality of CoTaZr layers which are anti ferro magnetically coupled with Ru layers therebetween. The Ru layer is, for example, a layer having a hcp crystal structure. The film thickness of the Ru layer is, for example, about 0.9 nm. Each CoTaZr layer is a layer having an amorphous structure. The film thickness of each CoTaZr layer is, for example, 20 to 27.5 nm.

The underlayer 18 is a layer for controlling the crystal structure of the perpendicular magnetic recording layer 30. The underlayer 18 may be a laminated film composed of a plurality of types of films. In the present example, the underlayer 18 comprises a first orientation control layer, a second orientation control layer, an isolation-promoting layer, and a fining-promoting layer in this order on the soft magnetic layer 16.

The first orientation control layer is a layer for controlling the crystal orientation of the second orientation control layer disposed as a layer on the first orientation control layer. In the present example, the first orientation control layer is, for example, a Ta layer or a CoCrTa layer having a bcc crystal structure close to amorphous. The film thickness of the first orientation control layer is, for example, about 3 nm.

The second orientation control layer is a layer for improving the orientation property of the layer further disposed thereon. In the present example, the second orientation control layer is a Ru layer having a hcp crystal structure. The film thickness of the second orientation control layer is, for example, about 10 nm.

The isolation-promoting layer is a layer for separating the composition of the upper layer and promoting isolation of crystal grains. The isolation-promoting layer is formed by, for example, sputtering at a gas pressure higher than the pressure during film formation of the Ru layer of the second orientation control layer. Consequently, the isolation-promoting layer becomes a layer containing small crystals in which crystal grains are isolated from each other. In the present example, the isolation-promoting layer is a Ru layer having a hop crystal structure. The film thickness of the isolation-promoting layer is, for example, about 10 nm.

The fining-promoting layer promotes fining of crystal grains in a layer disposed thereon. In the present example, the fining-promoting layer is a nonmagnetic crystal grain layer ($CoCr-SiO_2$ layer) having a granular structure in which SiO$_2$ is segregated at grain boundaries of nonmagnetic CoCr crystal grains. In the fining-promoting layer, the crystal structure of CoCr is, for example, a hcp crystal structure. A part of the fining-promoting layer may contain CoCr having a bcc crystal structure. The SiO$_2$ content in the fining-promoting layer is, for example, about 12 atomic percent (for example, 10 to 16 atomic percent). The film thickness of the fining-promoting layer is, for example, about 2 nm. The granular layer 20 of the perpendicular magnetic recording layer 30 is formed on the fining-promoting layer.

The granular layer 20 is a layer having a granular structure in which oxides are segregated at grain boundaries of fined crystal grains, and is an example of the first magnetic layer. In the present example, the granular layer 20 is a CoCrPt—SiO$_2$ layer and contains magnetic crystal grains 102 and nonmagnetic substances 104 for magnetically separating the magnetic crystal grains 102 from each other at grain boundaries of the magnetic crystal grains 102. The film thickness of the granular layer 20 is, for example, 20 nm or less, desirably 8 to 16 nm, and further desirably 7 to 15 nm (for example, about 9 nm). The magnetic crystal grains 102 are magnetic crystal grains exhibiting perpendicular magnetic anisotropy and the direction of magnetic moment is reversed in accordance with a signal to be recorded on the magnetic recording medium 10. In the present example, the magnetic crystal grain 102 is CoCrPt having a hcp crystal structure. The size (diameter) of the magnetic crystal grain 102 is, for example, 5 to 20 nm, and desirably 8 to 15 nm. The width of grain boundaries of the magnetic crystal grains 102 is 2 nm or more, for example, 2 to 20 nm, and desirably 4 to 15 nm. The width of grain boundaries of the magnetic crystal grains 102 refers to an average value of widths of grain boundaries of magnetic crystal grains 102 in, for example, the granular layer 20.

The nonmagnetic substances 104 are nonmagnetic oxides segregated at grain boundaries of the magnetic crystal grains 102, In the present example, the nonmagnetic substance is, for example, silicon oxide (SiO$_2$). For example, titanium oxide (TiO$_2$) may be used as the nonmagnetic substance 104 instead of SiO$_2$. The content of SiO$_2$ and the like in the granular layer 20 is, for example, 10 to 16 atomic percent, and desirably 12 to 14 atomic percent.

For example, in the case where the content of SiO$_2$ is 6 atomic percent or more, the nonmagnetic substances 104 are made finer to thereby increase the SN ratio. However, deterioration may occur in the coercive force Hc, perpendicular magnetic anisotropy, or the like of the granular layer 20 alone. Consequently, the thermal stability of the granular layer 20 alone may thereby deteriorates. However, in the present example, the continuous film layer 24 is disposed on the granular layer 20, Therefore, even when the content of SiO$_2$ and the like increases in the granular layer 20, occurrences of these problems can be suppressed.

The coupling control layer 22 is a layer for controlling the strength of magnetic coupling between the granular layer 20 and the continuous film layer 24. In the present example, the coupling control layer 22 is, for example, a Pd layer having a fcc crystal structure. The film thickness of the coupling control layer 22 is, for example, 2 nm or less, for example, 0.5 to 1.5 nm, and desirably 0.7 to 1.0 nm (for example, about 0.8 nm). The coupling control layer 22 may be a Pt layer.

The continuous film layer 24 is a layer in which exchange coupling in a direction parallel to the main surface of the substrate 12 is continuously expanded. The continuous film layer 24 is an example of the second magnetic layer and contains magnetic grains exhibiting perpendicular magnetic anisotropy. These magnetic grains are magnetically exchange-coupled to the magnetic crystal grains 102 in the granular layer 20 in a direction perpendicular to the main surface of the substrate 12.

The width of grain boundaries of the magnetic grains are smaller than that of grain boundaries of the magnetic crystal grains 102 in the granular layer 20, and is, for example, 1 nm or less, for example, 0.1 to 1 nm, and desirably 0.3 to 0.8 nm. Consequently, magnetic grains of the continuous film layer 24 are exchange-coupled to each other with the strength larger than the bonding strength between the magnetic crystal grains 102 in the granular layer 20 in a direction parallel to the main surface of the substrate 12. As a result, according to this structure, the thermal stability of recorded signals can be appropriately improved by, for example, pinning the magnetization of the continuous film layer 24 with the magnetization of the granular layer 20. The film thickness of the continuous film layer 24 is, for example, 1 to 8 nm, desirably 3 to 6 nm, and further desirably 4 to 5 nm.

The ratio A/B of the film thickness A of the granular layer 20 to the film thickness B of the continuous film layer 24 is, for example, 2 to 5, and desirably 3 to 4. According to this structure, suitable perpendicular magnetic recording characteristic can be exhibited by exchange coupling. Preferably, the magnetic anisotropy constant (maximum anisotropic energy) Ku of the continuous film layer 24 is larger than that of, for example, the soft magnetic substance. According to this structure, the width of the magnetic wall generated in the continuous film layer 24 is can be decreased. The magnetic anisotropy constant Ku of the continuous film layer 24 may be smaller than that of the granular layer 20. The coercive force Hc of the material for constituting the continuous film layer 24 may be smaller than the coercive force Hc of, for example, the material constituting the magnetic crystal grains 102 in the granular layer 20.

In the present example, the continuous film layer 24 is a multilayer film and about 3 layers (for example, 2 to 3 layers) of CoCr layers 106 and about 3 layers (for example, 2 to 3 layers) of Pd layers 108 are alternately laminated. The CoCr layer 106 is a layer containing magnetic grains of CoCr. The film thickness of the CoCr layer 106 is, for example, about 0.35 nm. In the case where the CoCr layer 106 is very thin as described above, the magnetic grains of CoCr may not have a crystal structure. The CoCr layer 106 may contain magnetic crystal grains of CoCr having, for example, a hpc crystal structure. The Pd layer 108 is a layer of nonmagnetic Pd having a fcc crystal structure. The film thickness of the Pd layer 108 is, for example, about 0.8 nm. In this structure, interface magnetic anisotropy is generated at the interface between the CoCr layer 106 and the Pd layer 108. Furthermore, required perpendicular magnetic anisotropy can be obtained by laminating, for example, 3 layers of CoCr layer 106 and 3 layers of Pd layer 108. Moreover, the film thickness of the continuous film layer 24 can be decreased in the case where the continuous film layer 24 is composed of the multilayer film as in the present example.

The continuous film layer 24 may have, for example, Pt layers in place of the Pd layers 108. The continuous film layer 24 may have CoB layers in place of the CoCr layers 106. The continuous film layer 24 may be a laminated film, n×[CoX/Pd or Pt], wherein n layers of Co compound layer and n layers of Pd layer or Pt layer are alternately laminated. Alternatively, the continuous film layer 24 may be a single-layer film having, for example, a high Pt content. The continuous film layer 24 may be a single-layer film of, for example, CoCrPt, CoPt, CoPd, FePt, CoPt$_3$, CoPd$_3$, amorphous TbFeCoCr, SmCo$_5$, Nd$_2$Fe$_{14}$B, or Co$_{20}$Pt$_{80}$.

In the continuous film layer 24 of the present example, separation regions 202 for magnetically separating tracks from each other are disposed in regions between the tracks of the magnetic recording medium 10. The separation regions 202 are nonmagnetic regions and are formed by changing the crystal structure of a part of the continuous film layer 24 by ion beam irradiation.

In the present example, the magnetic recording medium 10 is a discrete track recording (DTR) medium. Therefore, the separation regions 202 are formed in regions between the tracks. In the case where the magnetic recording medium 10 is a patterned (bit patterned) medium, the separation regions 202 are further formed in, for example, the regions between the individual bits on the tracks in such a manner that single-magnetic-domain grains become a recording unit.

The separation regions 202 are formed in the regions between the tracks of the magnetic recording medium 10 in the step of applying the ion beam. The step of applying the ion beam is performed, for example, after the step of forming the perpendicular magnetic recording layer 30 and before the step of forming the protective layer 26.

In the present example, the track width of the magnetic recording medium 10 is, for example, 100 to 200 nm, and desirably 135 to 165 nm. The distance between tracks is a distance from a center of a track to a center of an adjacent track and is, for example, 150 to 250 nm, and desirably 180 to 220 nm. The width of the separation region 202 is, for example, 30 to 70 nm, and desirably 40 to 60 nm in the track width direction.

The protective layer 26 and the lubricant layer 28 are further disposed on the continuous film layer 24. The protective layer 26 is a layer for protecting the perpendicular magnetic recording layer 30 from the impact of the head. The protective layer 26 is a carbon based film having, for example, a diamond-like structure. The lubricant layer 28 is a layer for improving the lubricity between the head and the magnetic recording medium 10. The lubricant layer 28 is a perfluoropolyether (PFPE) film formed by, for example, a dip coating method.

FIG. 1B shows the first example of the ion beam irradiation method in the step of applying the ion beam. In the step of applying the ion beam to the continuous film layer 24 in the present example, the regions between the tracks are set as the regions to be irradiated with the ion beam 42 by using a silicon stencil mask 40. The separation regions 202 are formed by applying ion beam 42 to the regions. In this manner, the regions to be irradiated with the ion beam 42 can be set with high precision. Further, the separation regions 202 can be formed without using the mechanical working process nor the flattening process.

In the step of applying the ion beam, for example, an ion beam 42 of argon ion ($Ar^+$) is accelerated with energy of 20 to 30 keV and is applied. In this manner, the separation regions can be appropriately formed. An ion beam 42 of phosphorous ion ($P^+$) or the like may be applied in the step of applying the ion beam. For example, the crystal structure of the continuous film layer 24 is changed by the energy of the ion beam 42 so that the region irradiated with the ion beam 42 is changed to a nonmagnetic region in the step of applying the ion beam. In this manner, for example, nonmagnetic separation regions 202 are formed in the step of applying the ion beam.

In the step of applying the ion beam in the present example, the ion beam 42 is applied to the continuous film layer 24 in the form of a multilayer film so as to form an alloy of metals contained in the CoB layer 106 and the Pd layer 108 in the continuous film layer 24. In this manner, the separation regions 202 are formed. Thus, the separation regions are formed only in the continuous film layer 24 among the layers included in the perpendicular magnetic recording layer 30 in the step of applying the ion beam. According to the present example, the separation regions 202 can be appropriately formed with high precision. Further, the tracks can be appropriately separated from each other so as to increase the track density.

In the step of applying the ion beam, for example, use can be made of ions of He, B, C, N, Ne, Ar, Cr, Co, Kr, Xe, and Pt. The energy of the ion irradiation is desirably 5 to 100 keV. Preferably, the amount of ion beam irradiation (Dose) is $1 \times 10^{14}$ to $1 \times 10^{16}$/cm$^2$.

According to this example, a CGC medium is formed by the granular layer 20, the continuous film layer 24, and the like. Thus, a reduction of magnetic transition region noises and an improvement of thermal stability of recorded signals can be realized. Further, recording ease of signals can be appropriately obtained.

The separation regions 202 are disposed in the continuous film layer 24, so that track edge noises are reduced and the track density can be appropriately increased. Further, the separation regions 202 are formed only in the continuous film layer 24 thinner than the entire perpendicular magnetic recording layer 30. Therefore, the separation regions 202 can be formed with ease and high precision as compared with the case where the separation regions are formed in both the granular layer 20 and the continuous film layer 24. Consequently, the recording density of the magnetic recording medium 10 can be appropriately increased.

In the production process of the magnetic recording medium 10, preferably, each of the adhesion layer 14 to the continuous film layer 24 is formed by sputtering. In particular, formation by DC magnetron sputtering is preferable because a uniform film can be formed. Preferably, the protective layer 26 is formed by CVD.

In the formation of the CoCr layer 106 and the Pd layer 108 of the continuous film layer 24, preferably, Kr is used as a sputtering gas. Consequently, the interface between the CoCr layer 106 and the Pd layer 108 is formed cleanly. Thus, interface magnetic anisotropy can be generated more appropriately. The CoCr layer 106 and the Pd layer 108 may also be formed by CVD.

Figure 2:
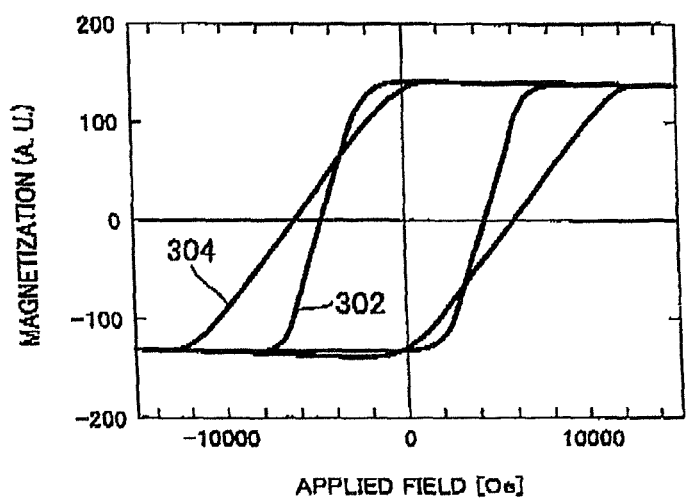
FIG. 2 is a diagram showing the magnetic characteristic of the magnetic recording medium.

FIG. 2 shows the magnetic characteristic of the magnetic recording medium 10, The hysteresis curve 302 indicates a magnetic characteristic on the region not including the separation regions 202 in the continuous film layer 24. In this case, the saturation magnetic field Hs is about 7,000 Oe. Consequently, magnetic recording can be appropriately performed on this region with, for example, a normal head.

The hysteresis curve 304 indicates a magnetic characteristic on the region including the separation regions 202 in the continuous film layer 24. In this case, the saturation magnetic field Hs is about 12,000 Oe. Consequently, it is difficult to perform magnetic recording on this region.

Therefore, in the magnetic recording medium 10 according to the present example, magnetic recording is performed only on regions not including the separation region 202. Consequently, according to the present example, the continuous film layer 24 is a part of the perpendicular magnetic recording layer 30, and the separation regions are formed in the continuous film layer 24. In this manner, the magnetic recording medium 10 can function as a patterned medium or a DTR medium without forming grooves or the like over the perpendicular magnetic recording layer 30. Thus, track edge noises are reduced and the track density is allowed to appropriately increase. As a result, according to the present example, the recording density of the magnetic recording medium 10 can be appropriately increased.

Figure 3A:
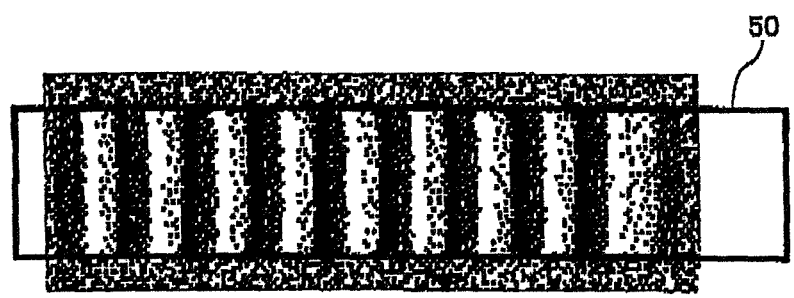
FIG. 3A is a diagram for illustrating the effect of formation of separation regions and shows a recording pattern of a granular medium.
Figure 3B:
FIG. 3B is a diagram for illustrating the effect of formation of separation regions and shows a recording pattern of a known CGC medium.

FIGS. 3A and 3B are diagrams for illustrating the effect of formation of separation regions 202 and shows the simulation results of recording pattern of the information recorded on a magnetic recording medium having a structure different from the structure of the magnetic recording medium 10 in the present example. FIG. 3A shows a recording pattern of a granular medium. The granular medium refers to, for example, a magnetic recording medium including a perpendicular magnetic recording layer composed of merely a magnetic layer equivalent or similar to the granular layer 20 without disposing the coupling control layer 22 nor the continuous film layer 24 in contrast to the present example. In this granular medium, the film thickness of the granular layer is 30 nm.

In the granular medium, an exchange interaction between the magnetic crystal grains is satisfactorily small in a direction parallel to the main surface of the substrate. In this case, the gray region does not easily extend in the track width direction, while the values of recorded signals become values between 0 and 1 in the gray region. Therefore, in the granular medium, recording patterns are appropriately recorded in a recording track indicated by a rectangle 50. Consequently, in the granular medium, even when separation regions are disposed between tracks as in a DTR medium or the like, the effect thereof is small.

However, in the granular medium, since the continuous film layer is not disposed, the thermal stability of recorded signals deteriorates as compared with, for example, the CGC media and the like. As a result, in the recording tracks, the magnetization of a part of the regions indicating individual bits of the recording pattern are reversed due to a thermal fluctuation phenomenon and the like. Such the reversal of magnetization may cause disappearance of the recorded information, so that an increase in recording density is hindered. Consequently, by the granular medium, it is difficult to realize a recording density exceeding, for example, 200 gigabits per square inch.

The granular medium may also be made into a DTR medium or a patterned medium by forming separation regions between the tracks. In this case, by forming the separation regions through ion beam irradiation, the mechanical working process and the flattening process are not required.

FIG. 3B shows a recording pattern of a CGC medium not including a separation region (hereafter referred to as a conventional CGC medium) in contrast to the present example. The conventional CGC medium is equivalent or similar to the magnetic recording medium 10 in the present example except that no separation region 202 is disposed. A perpendicular magnetic recording layer of the conventional CGC medium has a granular layer and a continuous film layer.

In the conventional CGC medium, since the continuous film layer has magnetic bonding strength in a direction parallel to the main surface of the substrate, the gray regions of recorded signals easily extend in the track width direction. Consequently, recording patterns are formed while having gray regions, and the gray regions extend out from the recording track width indicated by a rectangle 50.

Such gray regions serve as sources of track edge noises. Therefore, in the case where a recording density exceeding, for example, 200 gigabits per square inch is intended to realize in the known CGC medium, the SN ratio decreases, and an appropriate improvement of the track density becomes difficult.

On the other hand, in the magnetic recording medium 10 of the present example, the separation regions 202 are disposed in regions between the tracks. The disposed separation regions 202 prevent extension out of the magnetic bonding strength from the track in the continuous film layer 24 in the direction parallel to the main surface of the substrate 12, In this manner, the gray regions are prevented from extending out from the recording track width, Consequently, according to the present example, track edge noises are reduced and the track density can be appropriately increased. As a result, the recording density of the magnetic recording medium 10 can be appropriately increased.

FIGS. 4A to 4D are diagrams showing the second example of the ion beam irradiation method in the step of applying the ion beam. In the present example, a resist mask 44 formed by nanoimprint technology is used in the step of applying the ion beam.

Figure 4A:
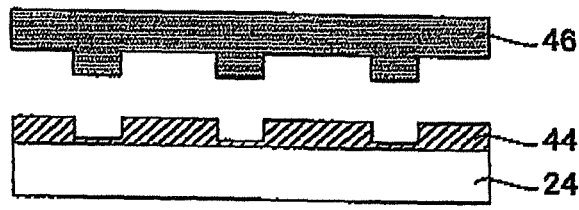
FIGS. 4A to 4D are diagrams showing a second example of the ion beam irradiation method in the step of applying the ion beam.
Figure 4B:
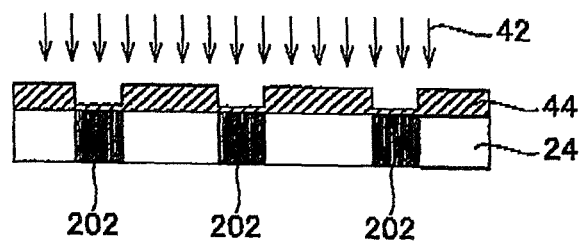

As shown in FIG. 4A, in the step of applying the ion beam, the resist mask 44 is formed by using, for example, a nanoimprint mold 46 and performing debossing into a resist film applied on the continuous film layer 24. Subsequently, as shown in FIG. 4B, the ion beam 42 is applied by using this resist mask 44 as a mask so as to form separation regions 202 in the continuous film layer 24.

Figure 4C:
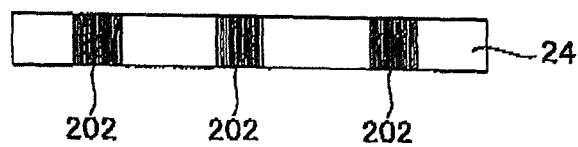
Figure 4D:
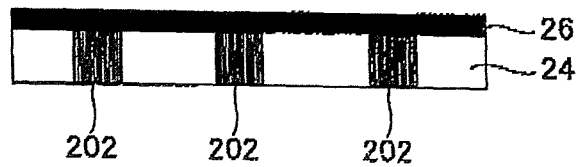

After the separation regions 202 are formed, as shown in FIG. 4C, the resist mask 44 is removed by, for example, ashing and cleaning. In this case also, the separation regions 202 can be appropriately formed. After the step of applying the ion beam, as shown in FIG. 4D, for example, a carbon overcoat protective layer 26 is formed on the continuous film layer 24 in, for example, the step of forming the protective layer.

Figure 5A:
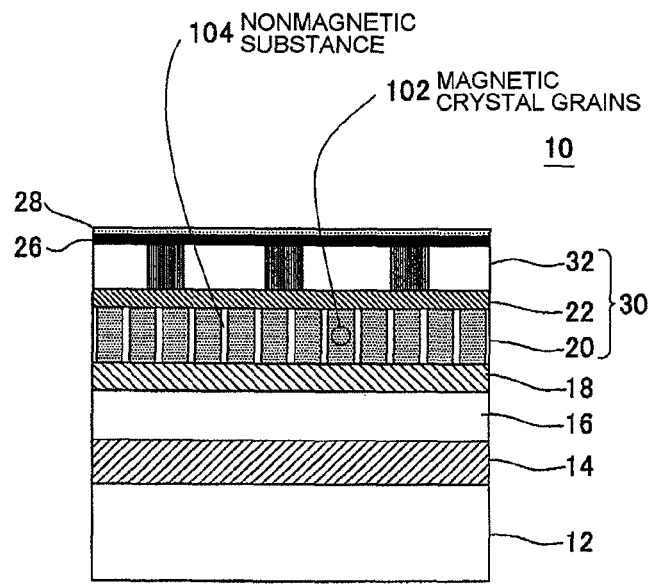
FIG. 5A is a diagram showing a modified example of the magnetic recording medium and shows the structure of a magnetic recording medium having an exchange spring medium structure.
Figure 5B:
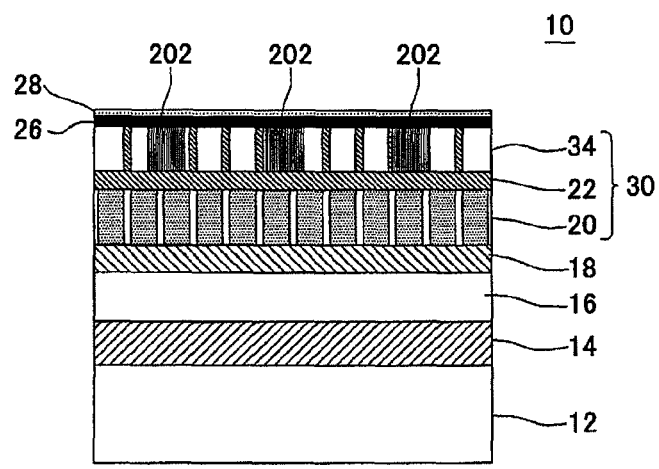
FIG. 5B is a diagram showing a modified example of the magnetic recording medium and shows the structure of a magnetic recording medium having an exchange coupled composite structure.

FIGS. 5A and 5B show modified examples of the magnetic recording medium 10. The structures equivalent or similar to those in FIG. 1 are indicated by the same reference numerals as in FIG. 1 and explanations thereof are omitted except the points as described below.

FIG. 5A shows the structure of a magnetic recording medium 10 having an exchange spring medium structure. In this case, the magnetic recording medium 10 has a soft magnetic layer 32 as a second magnetic layer of the perpendicular magnetic recording layer 30 in place of the continuous film layer 24 (refer to FIG. 1). For example, a material equivalent or similar to the material for the soft magnetic layer 16 can be used as the material for the soft magnetic layer 32. The film thickness of the soft magnetic layer 32 is, for example, 3 to 5 nm.

Separation regions 202 are formed in the soft magnetic layer 32 by applying the ion beam as in the continuous film layer 24. In this case also, track edge noises are reduced and the track density can be appropriately increased. Consequently, the recording density of the magnetic recording medium 10 can be appropriately increased.

FIG. 5B shows the structure of a magnetic recording medium 10 having an exchange coupled composite medium structure. In this case, the magnetic recording medium 10 has a soft magnetic layer 34 as a second magnetic layer of the perpendicular magnetic recording layer 30 in place of the continuous film layer 24. In a manner similar to that in the continuous film layer 24, separation regions 202 are formed in the soft magnetic layer 34 by ion beam irradiation.

The soft magnetic layer 34 is, for example, a NiFe layer containing $SiO_2$ at grain boundaries (NiFe—$SiO_2$ layer). The film thickness of the soft magnetic layer 34 is, for example, 2 to 4 nm (for example, about 3 nm). In this case also, track edge noises are reduced and the track density can be appropriately increased. Consequently, the recording density of the magnetic recording medium 10 can be appropriately increased.

Alternatively, the soft magnetic layer 34 may be a FeSiO layer. In this case, the film thickness of the soft magnetic layer 34 is, for example, 6 to 7 nm (for example, about 6.5 nm). The perpendicular magnetic recording layer 30 may has a laminated film (for example, 16×[Co/PdSi]) in place of the granular layer 20. In the laminated film, 12 to 20 layers of Co layer and 12 to 20 layers of PdSi layer (for example, about 16 layers each) are laminated.

Example 1

An evacuated film formation apparatus was used. An adhesion layer 14 and a soft magnetic layer 16 were sequentially formed on an aluminosilicate glass substrate 12 by DC magnetron sputtering in an Ar atmosphere. At this case, the adhesion layer 14 was formed by using a CrTi target so as to become a CrTi layer having a thickness of 10 nm. The soft magnetic layer 16 was formed by using a CoTaZr target so as to become an amorphous CoTaZr (Co; 88 atomic percent, Ta: 7 atomic percent, Zr: 5 atomic percent) layer having a total thickness of 50 nm. The soft magnetic layer 16 had a two-layer structure sandwiching a Ru layer having a thickness of 0.9 nm in order to control the magnetic domain.

After the formation of the soft magnetic layer 16, continuously, a Ta layer (thickness 3 nm) serving as a first orientation control layer and a Ru layer (thickness 20 nm) serving as a second orientation control layer and an isolation-promoting layer were formed as an underlayer 18 by DC magnetron sputtering in an Ar atmosphere A granular layer 20 was formed by using a hard magnetic substance target formed from CoCrPt—SiO$_2$. The granular layer 20 had a thickness of 9 nm and contained magnetic crystal grains 102 having a hcp crystal structure. The composition of the target for forming the granular layer 20 was 62 atomic percent of Co, 10 atomic percent of Cr, 16 atomic percent of Pt, and 10 atomic percent of SiO$_2$.

A Pd layer (thickness 0.8 nm) was formed as the coupling control layer 22 and 3×[CoCr/Pd] layers were formed as the continuous film layer 24 by using an Ar gas as a sputtering gas at a low pressure. The thickness of the CoCr layer was 0.4 nm, the thickness of the Pd layer was 0.9 nm. Three each of them were alternately laminated. The thickness of resulting continuous film layer 24 was 4 nm (3.9 to 4 mm).

As described with reference to FIG. 1B, a medium including up to the continuous film layer 24 was irradiated with the ion beam 42 of argon ion (Ar$^+$) accelerated with energy of 25 keV by using the stencil mask 40. In this manner, the separation regions 202 were formed in regions between the tracks.

The amount of irradiation of ions was $5 \times 10^{14}/cm^2$ in this ion beam irradiation. The width of the resulting separation region 202 in the track width direction was 50 nm. The track width was 150 nm and the distance between the tracks was 200 nm.

A protective layer 26 was formed from hydrogenated carbon by using a mixed gas composed of Ar containing 30% of hydrogen and a carbon target as a sputtering target. The film hardness is improved by using hydrogenated carbon, so that the perpendicular magnetic recording layer 30 can be appropriately protected from the impact of the head. Subsequently, a lubricant layer 28 composed of perfluoropolyether (PFPE) was formed by a dip coating method. The film thickness of the lubricant layer 28 was 1 nm. In this manner, the magnetic recording medium 10 according to Example 1 was formed. The magnetic recording medium 10 according to Example 1 was a DTR medium.

Example 2

The soft magnetic layer 32 having a thickness of 4 nm was formed from the same material as that for the soft magnetic layer 16 in place of the continuous film layer 24. In this manner, the magnetic recording medium 10 serving as an exchange spring medium was formed. An ion beam 42 of phosphorous ion (P$^+$) was accelerated with energy of 25 keV and was used in the step of applying the ion beam. The amount of irradiation of ions was $4 \times 10^{15}/cm^2$ in this ion beam irradiation. The magnetic recording medium 10 according to Example 2 was formed as in Example 1 except the factors described above.

Example 3

A NiFe layer containing SiO$_2$ at grain boundaries (NiFe—SiO$_2$ layer) and having a thickness of 3 nm was formed as the soft magnetic layer 34 in place of the continuous film layer 24. In this manner, the magnetic recording medium 10 serving as an exchange coupled composite medium was formed. An ion beam 42 of boron ion (B$^+$) was accelerated with energy of 20 keV and was used in the step of applying the ion beam. The amount of irradiation of ions was $4 \times 10^{15}/cm^2$ in this ion beam irradiation. The magnetic recording medium 10 according to Example 3 was formed as in Example 1 except the factors described above.

Comparative Example 1

A magnetic recording medium according to Comparative example 1 was formed as in Example 1 except that the coupling control layer 22 and the continuous film layer 24 were not formed. The magnetic recording medium according to Comparative example 1 was the granular medium explained with reference to FIG. 3A.

Comparative Example 2

A magnetic recording medium according to Comparative example 2 was formed as in Example 1 except that the separation region 202 was not formed. The magnetic recording medium according to Comparative example 2 was the conventional CGC medium explained with reference to FIG. 3B.

(Evaluation)

As described with reference to FIG. 3A, in the magnetic recording medium according to Comparative example 1, the thermal stability of recorded signals is unsatisfactory. As described with reference to FIG. 3B, in the magnetic recording medium according to Comparative example 2, gray regions of recorded signals extend in the track width direction so that track edge noises increase, Consequently, in these cases, it is difficult to realize a recording density exceeding, for example, 200 gigabits per square inch.

On the other hand, in the magnetic recording medium 10 according to Examples 1-3, satisfactory thermal stability can be obtained because of the CGC medium structure as compared with, for example, the magnetic recording medium according to Comparative example 1. Since the separation regions 202 are formed, track edge noises can be reduced as compared with, for example, the magnetic recording medium according to Comparative example 2, As a result, the SN ratio of the magnetic recording medium 10 according to Examples 1-3 is improved by about 1.0 to 3.5 dB as compared with that of the magnetic recording medium according to Comparative example 2. Consequently, a recording density exceeding 200 gigabits per square inch can be realized. In the magnetic recording medium 10 according to Example 1, the characteristics, such as thermal stability, are particularly excellent and a recording density of 500 gigabits per square inch or more can be realized.

The present invention has been described with reference to the embodiments. However, the technical scope of the present invention is not limited to the scopes described in the above embodiments. It is clear that various changes or improvements can be applied to the above-described embodiments by one skilled in the art. The forms applied with such changes or improvements may be included within the technical scope of the present invention as defined in the claims.

The present invention can be favorably applied to, for example, magnetic recording media.

On the other hand, in the magnetic recording media 10 according to Examples 1 to 3, satisfactory thermal stability can be obtained because of the CGC medium structure or the like as compared with, for example, the magnetic recording medium according to Comparative example 1. Since the separation regions 202 are formed, track edge noises can be reduced as compared with, for example, the magnetic recording medium according to Comparative example 2. As a result, the SN ratio of the magnetic recording media 10 according to Examples 1 to 3 are improved by about 1.0 to 3 dB as compared with that of the magnetic recording medium according to Comparative example 2. Consequently, it is ascertained that a recording density exceeding 200 gigabits per square inch can be realized. The magnetic recording medium 10 according to Example 1 exhibits particularly excellent characteristics such as the heat stability. It is ascertained that a recording density of 500 gigabits per square inch or more can be realized.

What is claimed is:

1. A method for manufacturing a magnetic recording medium comprising the steps of:
   (a) forming a magnetic recording layer comprising a first magnetic layer and a second magnetic layer, the first magnetic layer being a granular layer having a granular structure while the second magnetic layer being a continuous film layer, wherein the continuous film layer is a multilayer film,
   (b) applying an ion beam to regions between tracks of the magnetic recording medium so as to form separation regions for magnetically separating the tracks from each other, wherein:
   the step (b) is performed after the step (a),
   the step (a) comprises the step of forming the second magnetic layer on the first magnetic layer, and a plurality of types of metal films having different compositions are laminated in the multilayer film; and
   in the step (b), the second magnetic layer is irradiated with the ion beam such that the plurality of types of metal films are melted by the ion beam to form an alloy of metals contained in the plurality of types of metal films to thereby form the separation regions, and the separation regions are formed only in the second magnetic layer of the magnetic recording layer of the magnetic recording medium,
   wherein the resulting separation regions formed in the second magnetic layer are nonmagnetic.

2. The method for manufacturing a magnetic recording medium according to claim 1,
   wherein the first magnetic layer and the second magnetic layer are exchange-coupled to each other.

3. The method for manufacturing a magnetic recording medium according to claim 2,
   wherein the magnetic recording medium is used for perpendicular magnetic recording,
   the first magnetic layer has magnetic crystal grains exhibiting perpendicular magnetic anisotropy and nonmagnetic substances for magnetically separating the magnetic crystal grains from each other at grain boundaries of the magnetic crystal grains, and
   the second magnetic layer has magnetic grains exchange-coupled to the magnetic crystal grains, a grain boundary width of the magnetic grains being smaller than a grain boundary width of the magnetic crystal grains.

4. The method for manufacturing a magnetic recording medium according to claim 2,
   wherein the magnetic recording medium is used for perpendicular magnetic recording and comprises a substrate for disposing the first magnetic layer and the second magnetic layer,
   the first magnetic layer has magnetic crystal grains exhibiting perpendicular magnetic anisotropy and nonmagnetic substances for magnetically separating the magnetic crystal grains from each other at grain boundaries of the magnetic crystal grains, and
   the second magnetic layer has magnetic grains exchange-coupled to the magnetic crystal grains and exchange-coupled to each other with a strength larger than a bonding strength between the magnetic crystal grains in the first magnetic layer in a direction parallel to a main surface of the substrate.

5. The method for manufacturing a magnetic recording medium according to claim 1,
   a recording region that is applied with the ion beam has a first saturation magnetic field,
   a recording region that is not applied with the ion beam has a second saturation magnetic field, and
   the first saturation magnetic field is greater than the second saturation magnetic field.

6. The method for manufacturing a magnetic recording medium according to claim 1, wherein the plurality of types of metal films comprise of CoCr layers or CoB layers alternately laminated with Pd layers or Pt layers.

* * * * *